US009157356B2

(12) United States Patent
Balthes et al.

(10) Patent No.: US 9,157,356 B2
(45) Date of Patent: Oct. 13, 2015

(54) METHOD FOR OPERATING A MOTOR VEHICLE DIESEL ENGINE

(75) Inventors: Ortwin Balthes, Sachsenheim (DE); Thomas Beckmann, Stuttgart (DE); Berthold Keppeler, Owen (DE); Siegfried Mueller, Ingersheim (DE)

(73) Assignee: Daimler AG, Stuttgart (DE)

( * ) Notice: Subject to any disclaimer, the term of this patent is extended or adjusted under 35 U.S.C. 154(b) by 25 days.

(21) Appl. No.: 14/115,695

(22) PCT Filed: Dec. 9, 2011

(86) PCT No.: PCT/EP2011/006216
§ 371 (c)(1),
(2), (4) Date: Jan. 8, 2014

(87) PCT Pub. No.: WO2012/152301
PCT Pub. Date: Nov. 15, 2012

(65) Prior Publication Data
US 2014/0109554 A1    Apr. 24, 2014

(30) Foreign Application Priority Data
May 6, 2011    (DE) .......................... 10 2011 100 677

(51) Int. Cl.
*F01N 3/00* (2006.01)
*F01N 3/20* (2006.01)
(Continued)

(52) U.S. Cl.
CPC .............. *F01N 3/2066* (2013.01); *F01N 3/023* (2013.01); *F01N 3/30* (2013.01); *F01N 9/002* (2013.01); *F01N 13/009* (2014.06);
(Continued)

(58) Field of Classification Search
USPC ........... 60/274, 278, 280, 287, 289, 292, 295, 60/297, 301
See application file for complete search history.

(56) References Cited

U.S. PATENT DOCUMENTS 6,915,629 B2 * 7/2005 Szymkowicz .................. 60/289
7,669,579 B2    3/2010 Lang et al.
(Continued)

FOREIGN PATENT DOCUMENTS

DE    10 2006 020 675 A1    11/2007
DE    10 2008 032 604 A1    1/2010
(Continued)

OTHER PUBLICATIONS

International Search Report dated Mar. 13, 2012 with English translation (four (4) pages).
(Continued)

*Primary Examiner* — Binh Q Tran
(74) *Attorney, Agent, or Firm* — Crowell & Moring LLP

(57) ABSTRACT

A method for operating a motor vehicle diesel engine having an exhaust emission control system is provided. The emission control system includes an oxidation catalytic converter, a particle filter, and an SCR catalytic converter, in which the exhaust gas that is discharged from the diesel engine is passed through the oxidation catalytic converter before passing through the particle filter and the SCR catalytic converter. A regeneration of the particle filter with thermal soot burn-off is occasionally carried out, during which the diesel engine is operated at an air-fuel ratio having a lambda value ($\lambda$) of at least approximately 1.0, and air is added to the exhaust gas after it exits the oxidation catalytic converter and before it enters the particle filter air, so that soot deposited on the particle filter is burnt-off.

19 Claims, 1 Drawing Sheet

(51) Int. Cl.
- *F01N 3/023* (2006.01)
- *F01N 3/30* (2006.01)
- *F01N 9/00* (2006.01)
- *F02D 41/00* (2006.01)
- *F02D 41/02* (2006.01)
- *F02M 25/07* (2006.01)
- *F01N 13/00* (2010.01)
- *F02B 29/04* (2006.01)
- *F02M 35/10* (2006.01)

(52) U.S. Cl.
CPC ......... *F02D 41/0055* (2013.01); *F02D 41/029* (2013.01); *F02M 25/0711* (2013.01); *F02M 25/0718* (2013.01); *F01N 2430/06* (2013.01); *F02B 29/0418* (2013.01); *F02M 25/074* (2013.01); *F02M 25/0732* (2013.01); *F02M 35/1038* (2013.01); *Y02T 10/22* (2013.01); *Y02T 10/24* (2013.01); *Y02T 10/47* (2013.01)

(56) References Cited

U.S. PATENT DOCUMENTS

| | | | |
|---|---|---|---|
| 7,814,747 B2 * | 10/2010 | Bandl-Konrad et al. | 60/297 |
| 8,181,445 B2 * | 5/2012 | Duvinage et al. | 60/286 |
| 8,341,947 B2 * | 1/2013 | Hepburn et al. | 60/297 |
| 8,387,370 B2 | 3/2013 | Van Nieuwstadt et al. | |
| 8,499,545 B2 * | 8/2013 | Busch et al. | 60/277 |
| 8,635,852 B2 * | 1/2014 | Lupescu et al. | 60/278 |
| 8,833,059 B2 * | 9/2014 | Keppeler | 60/287 |
| 2010/0221164 A1 | 9/2010 | Lee et al. | |

FOREIGN PATENT DOCUMENTS

| | | |
|---|---|---|
| DE | 10 2009 043 087 A1 | 3/2011 |
| DE | 10 2010 046 900 A1 | 4/2011 |
| EP | 1 630 369 A2 | 3/2006 |
| FR | 2 907 844 A1 | 5/2008 |
| JP | 2002-227630 A | 8/2002 |
| JP | 2005-9316 A | 1/2005 |
| JP | 2010-13974 A | 1/2010 |
| JP | 2010-174701 A | 8/2010 |
| JP | 2010-223076 A | 10/2010 |
| JP | 2010-236460 A | 10/2010 |
| WO | WO 99/39809 A1 | 8/1999 |
| WO | WO 2010/094313 A1 | 8/2010 |

OTHER PUBLICATIONS

German-language Written Opinion (PCT/ISA/237) dated Mar. 13, 2012 (six (6) pages).

English translation of Japanese Office Action dated Mar. 3, 2015.

* cited by examiner

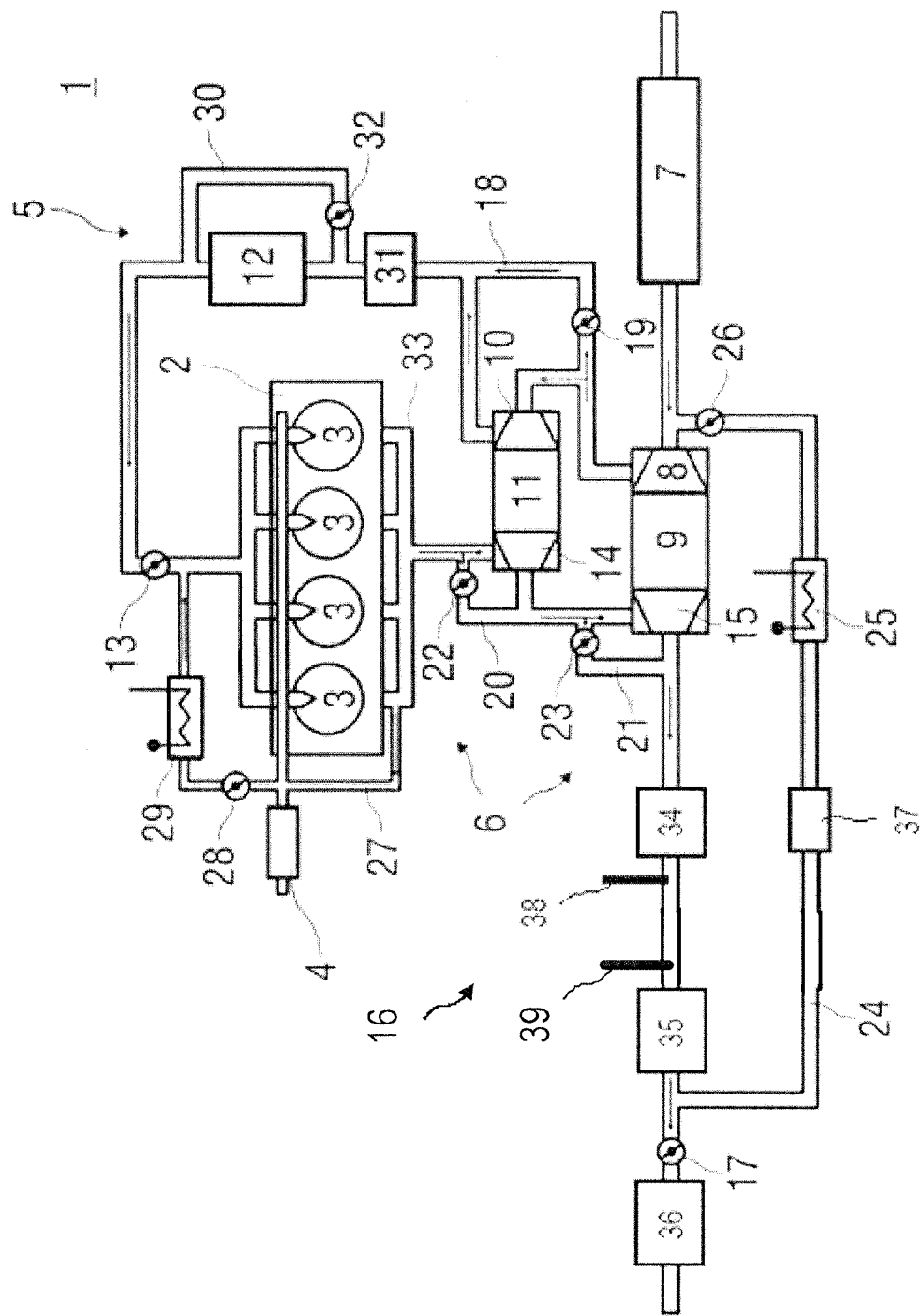

METHOD FOR OPERATING A MOTOR VEHICLE DIESEL ENGINE

BACKGROUND AND SUMMARY OF THE INVENTION

Exemplary embodiments of the present invention relate to method for operating a motor vehicle diesel engine having an exhaust emission control system, comprising an oxidation catalytic converter, a particle filter, and an SCR catalytic converter, in which exhaust gas discharged from the diesel engine is passed through the oxidation catalytic converter before passing through the particle filter and the SCR catalytic converter.

PCT Patent Publication WO 99/39809 A1 describes an exhaust emission control system provided for a diesel engine, having an oxidation catalytic converter, a particle filter, and an SCR catalytic converter situated one behind the other.

In exhaust emission control systems having a particle filter and an SCR catalytic converter, it is generally problematic that, due to the operating conditions, nitrogen oxides (NOx) are emitted to the surroundings largely unconverted during thermal regeneration of a particle filter in which soot is burnt-off.

Exemplary embodiments of the present invention are directed to a method for operating a motor vehicle diesel engine having this type of exhaust emission control system, the method allowing a reduction in NOx even when a thermal particle filter regeneration with soot burn-off is performed.

For the method according to the invention, a regeneration of the particle filter with thermal soot burn-off is occasionally carried out, and during the regeneration of the particle filter, the diesel engine is operated at an air-fuel ratio having a lambda value of at least approximately 1.0, and air is added to the exhaust gas after it exits the oxidation catalytic converter and before it enters the particle filter air, so that burn-off of soot deposited on the particle filter is made possible.

The invention is based on the finding that typical diesel oxidation catalytic converters are able to convert NOx as well as reducing exhaust gas components such as carbon monoxide (CO) and hydrocarbons (HC) into harmless components, even at high exhaust gas temperatures, when the diesel engine is operated at an air-fuel ratio having a $\lambda$ value of at least approximately 1.0. Catalyst formulations for diesel oxidation catalytic converters with or without oxygen storage capacity are known to those skilled in the art, so that no particular discussion of such is provided herein. In any case, coated supported catalysts, in which a metal or ceramic substrate is provided with a washcoat coating containing noble metal, are typical. Preferred noble metals are those of the platinum group, in particular platinum itself.

The SCR catalytic converter is a catalytic converter that is able to selectively and continuously reduce NOx under oxidizing conditions, i.e., at $\lambda > 1.0$, using ammonia ($NH_3$).

In this regard, the $\lambda$ value characterizing the air-fuel ratio is understood to mean, as is customary, a ratio of the quantity of oxygen actually present in the combustion air-fuel mixture to the minimum quantity of oxygen theoretically required for complete combustion of the fuel. A lean air-fuel mixture having excess air therefore has a $\lambda$ value of greater than one. On the other hand, a rich air-fuel mixture having excess fuel has a $\lambda$ value of less than one. In the absence of oxygen sources or sinks in the exhaust gas system, the lambda value in the exhaust gas (exhaust gas $\lambda$) corresponds to the lambda value of the air-fuel mixture (combustion $\lambda$) with which the engine is operated. For simplicity, therefore, reference is made below only to a $\lambda$ value, or $\lambda$ for short, when differentiation is not necessary.

Due to the addition of air to the exhaust gas according to the invention before the exhaust gas enters the particle filter, the particle filter is enriched with oxygen to a greater or lesser degree, so that a soot burn-off that regenerates the particle filter may proceed, a prerequisite being a prior temperature increase to an appropriately high temperature. A temperature of the exhaust gas or of the particle filter of greater than 550° C. is typically necessary for thermal soot burn-off. A burn-off rate that is customarily sought is usually achieved only above 650° C. At such high exhaust gas temperatures, the effectiveness of an SCR catalytic converter, also provided in the exhaust emission control system, with regard to NOx conversion is already greatly reduced. This is particularly true when the SCR catalytic converter is situated relatively close to the particle filter. In the present case, however, the oxidation catalytic converter may take over this function during the particle filter regeneration. As a result, removal of NOx from the exhaust gas is achieved even during a particle filter regeneration.

A so-called wallflow filter based on silicon carbide or aluminum titanate, which may optionally have a catalytically active coating on the channel walls, is preferably used as a particle filter.

A secondary air pump may be used for supplying air to the exhaust gas between the oxidation catalytic converter and the particle filter. It is likewise possible to withdraw air from a compressed air store, or to provide air by branching off from an intake tract by means of a turbocharger. A device for variably, in particular controllably, providing quantities of air is preferred.

In one embodiment of the invention, an oxidation catalytic converter having a three-way catalyst coating is used. This involves a catalyst material, which in a narrow range around $\lambda = 1.0$, is able to catalyze a conversion of NOx as well as reducing exhaust gas components such as CO and HC to harmless products. The catalyst coating typically contains platinum and/or palladium as well as rhodium, and also a material such as cerium oxide that is able to store and release oxygen. Appropriate catalyst formulations are known to those skilled in the art, in particular from applications regarding exhaust gas emission control of gasoline engines. As a result of this design, particularly effective removal of harmful exhaust gas components, NOx in particular, specifically when carrying out a particle filter regeneration, is achieved.

In another embodiment of the method, during a regeneration of the particle filter the addition of air is carried out with a mass flow such that the burn-off of soot deposited on the particle filter occurs at a predefinable rate. The soot burn-off rate is preferably determined by means of a temperature sensor that is able to detect, directly downstream from and/or in the particle filter, a quantity of heat released during the soot burn-off due to the resulting temperature development. Since the rate of the soot burn-off is a function of the oxygen partial pressure of the exhaust gas, the soot burn-off may be controlled or regulated via the added quantity of air. In this way, for example overheating of the particle filter is avoidable in that the added quantity of air, and thus the soot burn-off rate, is reduced or kept low. Supplying air which is regulated or controlled by means of a lambda sensor for achieving a desired soot burn-off rate is likewise possible. Since the air which promotes soot burn-off is supplied from an external source, engine operation which is independent from the air flow rate is made possible.

In another embodiment of the method, outside operating phases of a particle filter regeneration, the diesel engine is operated with excess air that is typical for normal diesel engine operation, and ammonia or a reducing agent, in particular an aqueous urea solution, which is capable of splitting ammonia is added to the exhaust gas before it passes through the SCR catalytic converter. NOx reduction occurs with the aid of the SCR catalytic converter. At the same time, removal of the oxidizable exhaust gas components by means of the oxidation catalytic converter is made possible.

In another embodiment of the method the exhaust gas is led through the SCR catalytic converter before and/or after passing through the particle filter. The SCR catalytic converter may be provided as a separate component upstream and/or downstream from the particle filter. In another particularly advantageous embodiment of the invention the exhaust gas is led through an SCR catalytic converter designed as a coating of the particle filter. The coating of the particle filter with an SCR catalyst material may be provided on the uncontrolled gas side or the clean gas side of the filter-active channel walls of the particle filter. It is preferred that the clean gas side is provided, at least on the downstream portion of the particle filter, with a coating containing an SCR catalyst material.

Further advantages, features, and particulars of the invention result from the following description of preferred exemplary embodiments, and with reference to the drawings. The features and feature combinations mentioned above in the description, as well as the features and feature combinations mentioned below in the description of the figures and/or shown in the figures alone, are usable not only in the particular stated combination, but also in other combinations or alone without departing from the scope of the invention.

BRIEF DESCRIPTION OF THE DRAWING FIGURE

The single FIGURE shows a schematic diagram of a motor vehicle diesel engine having an exhaust emission control system connected thereto.

DETAILED DESCRIPTION

FIG. 1 shows a purely schematic diagram of one advantageous embodiment of a motor vehicle diesel engine 1 having a connected exhaust emission control system in which the method explained in greater detail below may be used. In the present case, the diesel engine 1 has two-stage supercharging and two-stage exhaust gas recirculation, and includes an engine block 2 having working cylinders 3 with combustion chambers (not further identified), the working cylinders 3 and their respective combustion chambers can be supplied with fuel by means of a high-pressure pump 4. The working cylinders 3 and their respective combustion chambers may be supplied with combustion air via an air supply system 5, and exhaust gas may be discharged from the working cylinders 3 via an exhaust tract 6. An air filter 7, a first compressor 10 of a first exhaust gas turbocharger designed as a high-pressure exhaust gas turbocharger 11, a second compressor 8 of a second exhaust gas turbocharger designed as a low-pressure exhaust gas turbocharger 9, a charge air cooler 12, and a throttle valve 13 are situated in the air supply system 5.

Starting from the engine block 2 in the flow direction of the exhaust gas, the exhaust tract 6 includes a first turbine 14 associated with the high-pressure exhaust gas turbocharger 11, a second turbine 15 associated with the low-pressure exhaust gas turbocharger 9, and an exhaust emission control system 16. In the present case, the exhaust emission control system 16 has a particle filter 35 for filtering particles from the exhaust gas, and an oxidation catalytic converter 34 connected upstream. In addition, an electric heating element, not illustrated, may be provided in order to quickly bring the exhaust emission control system 16 to a required operating temperature or to an elevated temperature. The heating element is preferably situated directly upstream from the oxidation catalytic converter 34. The oxidation catalytic converter 34 is preferably designed as a so-called diesel oxidation catalytic converter having a coating with a three-way catalytic converter function, in particular with a metal foil support element. The electric heating element, if present, is also preferably designed as a coated metal foil support element (so-called E-catalytic converter).

The particle filter 35 may have a sintered metal design, or may be a filter unit having a honeycomb design with flow-through the walls. A catalytic coating, for example containing a material which acts as an oxidation catalyst and/or containing an SCR catalyst material, is preferably provided for the particle filter 35. Under oxidizing conditions, the SCR catalyst material may catalyze a selective, continuous reduction of NOx using stored and/or supplied ammonia ($NH_3$) as a selective NOx reducing agent. A zeolite containing iron or copper is preferred as catalyst material. The SCR catalyst material may be provided on the uncontrolled gas side and/or on the clean gas side of the filter-active surfaces of the particle filter 35. In the preferred design of the particle filter 35 as a customary wallflow filter having a honeycomb design, the coating containing the appropriate SCR catalyst material is preferably provided on the channel walls which are exposed to uncontrolled gas. In particular, it may be advantageous to provide the SCR catalyst coating only on portions of the channel walls of the particle filter 35 on the inlet side or outlet side. For example, a coating containing the SCR catalyst material may be provided over a first portion of the axial extension of the particle filter 35 that is approximately 50% of the length. The rear portion, viewed in the axial direction, may be uncoated or may be provided with a coating having oxidation catalyst activity.

For enriching the exhaust gas with ammonia, a dosing device 38 is provided between the oxidation catalytic converter 34 and the particle filter 35, which is able to inject ammonia or a reducing agent, for example a urea-water solution, which is capable of splitting ammonia, into the exhaust tract 6. For improving uniform distribution, a downstream mixer (not separately illustrated) may be situated in the exhaust tract 6.

In addition, in the present case an SCR catalytic converter unit 36 is situated in the exhaust tract 6, downstream from the particle filter 35. The SCR catalytic converter unit, analogously to the SCR catalyst material coating of the particle filter 35, is capable of selective reduction of NOx, using $NH_3$. The SCR catalytic converter unit 36 is preferably situated remote from the engine in the underbody area of the vehicle, in particular in a muffler. In any case, particularly preferred is an arrangement in the exhaust tract 6 in such a way that the temperature of the SCR catalytic converter unit does not exceed 550° C. during a thermal particle filter regeneration. As the result of the geometric distance from the particle filter 35 in conjunction with appropriate dimensioning of the exhaust tract 6 with regard to heat transfer, a temperature drop of greater than 250° C. may be achieved between a particle filter 35 which is heated to approximately 800° C. and the SCR catalytic converter unit 36.

The SCR catalytic converter unit 36 is preferably designed as a monolithic, honeycomb-shaped exhaust gas emission control component having an appropriate coating. A zeolitic coating based on copper or iron is likewise preferred. However, the SCR catalytic converter unit 36 may also be designed as a full extrudate honeycomb element, for example based on vanadium pentoxide/titanium oxide/tungsten oxide. It is particularly preferred that the SCR catalytic converter unit 36 has a temperature range of the catalytic activity that is different, in particular lower, in comparison to the SCR catalyst material of the particle filter coating. In addition, an embodiment with a comparatively large $NH_3$ storage capacity is preferred. To prevent emissions of $NH_3$ to the surroundings, for example due to thermal desorption or loading-related slip, a further oxidation catalytic converter, not separately illustrated, may be provided as a so-called blocking catalytic converter downstream from the SCR catalytic converter unit 36.

In addition, a secondary air dosing device 39 that is able to inject air into the exhaust tract 6 in variable quantities as needed is situated between the oxidation catalytic converter 34 and the particle filter 35. Although in the present case it is illustrated downstream from the dosing device 38, the secondary air dosing device 39 may also be situated upstream therefrom or structurally integrated into the dosing device 38. This allows compressed air-assisted turbulence and distribution of urea solution which is supplied to the exhaust gas by the dosing device 38. The secondary air dosing device 39 may be connected to a pump or a compressed air reservoir.

A compressor bypass 18 in which a compressor bypass valve 19 is situated and which bypasses the high-pressure exhaust gas turbocharger 11 branches off downstream from the second compressor 8, so that by means of the second compressor 8, compressed fresh air or a fresh air-exhaust gas mixture may pass through the first compressor 10 to a greater or lesser extent, depending on an operating state of the engine 1 and a resulting position of the compressor bypass valve 19. In this manner, a charge pressure of the engine 1 is controllable; i.e., at low speeds of the engine 1 in which the high-pressure exhaust gas turbocharger 11 is not yet operable due to exhaust gas pressure which is too low, the compressor 10 may be bypassed via the compressor bypass 18.

Likewise situated in the exhaust tract 6 are bypasses 20, 21, which bypass a turbine 14, 15, respectively, namely, a first turbine bypass 20 in which a first turbine bypass valve 22 is situated, and a second turbine bypass 21 in which a second turbine bypass valve 23 is situated. At low speeds of the engine 1 and thus a low exhaust gas pressure, the high-pressure exhaust gas turbocharger 11 is not yet operable, and therefore in this operating state the first turbine bypass valve 22 is controllable in such a way that an exhaust gas mass flow may be led past the first turbine 14 via the first turbine bypass 20, and is thus completely usable for driving the second turbine 15 of the low-pressure exhaust gas turbocharger 9.

At very high speeds of the engine 1, the exhaust gas pressure acting on the turbines 14, 15 of the exhaust gas turbochargers 11, 9, respectively, is high, thus achieving these high speeds. This results in high compressor power of the compressors 8, 10 of the exhaust gas turbochargers 9, 11, respectively, and thus a high charge pressure of the fresh air-exhaust gas mixture. However, this charge pressure must not exceed a predefined value, so that one or both turbine bypasses 20, 21 is/are usable as a so-called wastegate when this predefined value is reached. The turbine bypass valves 22, 23 are controllable in such a way that, for example, they partially open so that a portion of the exhaust gas mass flow may be led past the turbines 14, 15, and therefore the exhaust gas pressure acting on the turbines 14, 15 and drives same may be reduced. This results in a lesser degree of compression of the gas compressed by the compressors 8, 10 of the exhaust gas turbocharger 9, 11, respectively, i.e., results in a lower charge pressure.

By means of this configuration of the low-pressure exhaust gas turbocharger 9 and the high-pressure exhaust gas turbocharger 11, power of the engine 1 in different speed ranges may be optimized, and an optimal charge pressure may be achieved in each case. In particular, so-called turbo lag, i.e., an absent or low charge pressure, and consequently low power of this type of engine 1 in low speed ranges, is thus preventable, or this problem may be at least considerably reduced, and, for example, driving behavior and fuel consumption of a vehicle driven by this engine 1 may thus be optimized.

Downstream from the particle filter 35, i.e., on a low-pressure side of the exhaust tract 6, a low-pressure exhaust gas recirculation (EGR) line 24 branches off from the exhaust tract 6, and upstream from the second compressor 8 of the low-pressure exhaust gas turbocharger 9 and downstream from the air filter 7 in turn opens into the air supply system 5. The quantity or proportion of exhaust gas recirculated via the low-pressure exhaust gas recirculation line 24 may be influenced by means of an exhaust gas damming flap 17 situated in the exhaust tract 6. A second dosing device (not separately illustrated) for a reducing agent containing ammonia in free or bound form may be provided downstream from the damming flap 17 and upstream from the SCR catalytic converter unit 36. An ammonia supply, which is preferably separate and which is adapted to the particular operating conditions and the particular activity of the SCR catalyst coating of the particle filter 35 and SCR catalytic converter unit 36, is thus made possible. Although in the present case the exhaust gas damming flap 17 is illustrated situated downstream from the branch point of the low-pressure exhaust gas recirculation line 24, it may also be situated downstream from the SCR catalytic converter 36.

A low-pressure EGR cooler 25 and a low-pressure EGR valve 26 are situated in the low-pressure EGR line 24, downstream from the branch from the exhaust tract 6 viewed in the flow direction of a low-pressure EGR mass flow. Optionally, the cooling of the low-pressure EGR mass flow may be achieved via the pipe lengths or pipe configurations used, with omission of the low-pressure EGR cooler 25. The cooling of the low-pressure EGR mass flow ensures that impermissibly high temperatures do not arise at the compressors 8, 10 in exhaust gas recirculation mode.

A further SCR catalytic converter 37 in the low-pressure EGR line 24 may be provided upstream from the low-pressure EGR cooler 25. This further SCR catalytic converter allows a reduction in the nitrogen oxides and/or ammonia or oxygen that may be present in the recirculated exhaust gas. In turn, deposits and corrosion are thus avoided or decreased, and an improved fuel combustion process in the combustion chambers of the engine 1 is made possible. The further SCR catalytic converter 37 may also take over a filter function, so that at least comparatively coarse particles are removed from the exhaust gas that is recirculated via the low-pressure path. In addition, one or more further exhaust aftertreatment components effective in cleaning, for example an additional oxidation catalytic converter, an SCR catalytic converter, and/or a nitrogen oxides storage catalytic converter (not separately illustrated) may be situated in the exhaust tract 6, upstream and/or downstream from the oxidation catalytic converter 34 or the particle filter 35. It is particularly preferred for an exhaust emission control component having oxidation catalyst activity to be situated downstream from the SCR catalytic converter 36, by means of which ammonia slip of the SCR catalytic converter 36 may be removed from the exhaust gas.

Upstream from the turbine 14 of the high-pressure exhaust gas turbocharger 11, i.e., on a high-pressure side of the exhaust tract 6, a high-pressure EGR line 27 branches off from an exhaust manifold 33 of the exhaust tract 6 and opens into the air supply system 5 downstream from the throttle valve 13. A high-pressure EGR mass flow may be led into the air supply system 5 via a high-pressure EGR valve 28 by means of this high-pressure EGR line 27. In the illustrated embodiment, a high-pressure EGR cooler 29, which optionally may be structurally and/or functionally combined with the low-pressure EGR cooler 25, is situated in the high-pressure EGR line 27. However, cooling of the high-pressure EGR mass flow may optionally be carried out, for example, over a pipe length of the high-pressure EGR line 27. Bypass lines, in particular having adjusting means (not separately illustrated) for variably setting the throughput, may be provided for the low-pressure EGR cooler 25 and/or the high-pressure EGR cooler 29.

The illustrated diesel engine 1 thus has an exhaust gas recirculation system in which exhaust gas upstream from the turbine 14 of the high-pressure exhaust gas turbocharger 11 is removable from the exhaust tract 6 via a corresponding high-pressure path, and downstream from the exhaust emission control unit 16 is removable from the exhaust tract 6 via a corresponding low-pressure path, and, optionally after cooling, can be supplied upstream from the compressor 8 of the low-pressure exhaust gas turbocharger 9 and downstream from the throttle valve 13 of the air supply system 5, and thus can be supplied to the combustion chambers 3. The engine 1 is selectively operable without exhaust gas recirculation, with high-pressure exhaust gas recirculation or low-pressure exhaust gas recirculation, or simultaneously with high-pressure exhaust gas recirculation and low-pressure exhaust gas recirculation, in each case with variable quantities of recirculated exhaust gas. A combustion gas having an exhaust gas recirculation rate, having a variable low-pressure component and a variable high-pressure component which are changeable within wide limits, is thus can be supplied to the combustion chambers 3. Setting of an exhaust gas recirculation quantity, i.e., of the recirculated exhaust gas mass flow and thus of the EGR rate, is carried out by means of the exhaust gas damming flap 17 and/or the low-pressure EGR valve 26 and by means of the high-pressure EGR valve 28 as adjusting means, so that the low-pressure component as well as the high-pressure component of the overall recirculated exhaust gas can likewise be set within wide limits. This results in cleaner exhaust gas recirculation mass flows overall and better cooling of the exhaust gas recirculation mass flows, avoids sooting of the exhaust gas recirculation coolers 25, 29, and allows good intermixing of the exhaust gas recirculation mass flows with fresh air in the air supply system 5. High exhaust gas recirculation rates, and a homogeneous or at least partially homogeneous operation of the internal combustion engine 1, are possible.

In the present case, the exhaust gas damming flap 17 and the low-pressure EGR valve 26 are actuators of an exhaust gas recirculation control system designed as pilot control regulation. The low-pressure EGR valve 26 and the exhaust gas damming flap 17 are preferably continuously adjustable. The low-pressure component of the entire exhaust gas recirculation mass flow can be set and likewise influenced with the aid of the exhaust gas damming flap 17 and the low-pressure EGR valve 26 upstream from the compressor 8. As long as a sufficient pressure drop is present for conveying the low-pressure exhaust gas recirculation mass flow, the latter is initially settable solely via the low-pressure EGR valve 26. If this is no longer the case, the exhaust gas damming flap 17 is also slightly adjustable in order to increase the pressure drop over the low-pressure EGR valve 26. This ensures very good intermixing of the low-pressure exhaust gas recirculation mass flow with the fresh air. Another advantage, among others, is that the exhaust gas recirculated via the low-pressure path is clean and practically free of pulsations. In addition, increased compressor power is available, since a comparatively high exhaust gas mass flow may be led through the turbines 14, 15 for a high low-pressure component of recirculated exhaust gas. Since the recirculated exhaust gas may be led through the efficient charge air cooler 12 after leaving the compressors 8, 10, the temperature of the combustion gas which includes fresh air and exhaust gas may also be kept relatively cool. The internal combustion engine 1 is operable with the high-pressure exhaust gas recirculation as well as with the low-pressure exhaust gas recirculation, or with both, as needed.

Sooting of the charge air cooler 12 is avoidable by means of a charge air cooler bypass 30, bypassing the charge air cooler 12, in the air supply system 5. There is a risk of so-called sooting, for example, when a gas mixture, containing water vapor and optionally particles, in the charge air cooler 12 is cooled below the dew point and condensate is formed.

It is preferably provided that the entire fresh air-exhaust gas mixture or also only a portion thereof may be led past the charge air cooler 12 via the charge air cooler bypass 30 which branches off upstream from the charge air cooler 12, so that the fresh air-exhaust gas mixture is not coolable by the charge air cooler 12, and therefore the temperature does not fall below the dew point. To ensure that the fresh air-exhaust gas mixture is still effectively coolable by the charge air cooler 12 when necessary, i.e., at high temperatures of the fresh air-exhaust gas mixture, a temperature sensor 31 is situated downstream from the compressors 8, 10 and upstream from the charge air cooler 12 in the air supply system 5, so that when a predefined temperature is reached, a charge air cooler bypass valve 32 situated in the charge air cooler bypass 30 is appropriately controllable, whereupon this charge air cooler bypass valve 32 completely opens or completely closes, for example, or in another embodiment, partially opens.

For optimal operation of the engine 1 and the exhaust aftertreatment system 16, additional sensors, not illustrated in greater detail for the sake of clarity, are preferably provided in the exhaust tract 6 and in the air supply system 5. Temperature sensors and/or pressure sensors may be situated on the output side of the exhaust manifold 33, in the turbine bypasses 20, 21 on the input and/or output side or within the combination of the oxidation catalytic converter 34 and particle filter 35 exhaust emission control module, which is preferably designed as a compact unit, on the input and/or output side of the SCR catalytic converter 36, on the input and/or output side of the air filter 7, on the input and output side of the compressors 8, 10, in the exhaust gas recirculation lines 24, 27, and optionally at other locations in order to detect the temperature and pressure conditions. An air mass flow sensor is also preferably provided downstream from the air filter 7 in order to detect the fresh air mass flow. In addition, exhaust gas sensors are preferably provided in the exhaust tract 6, for example a lambda sensor in the exhaust manifold 33, situated upstream and/or downstream from the oxidation catalytic converter 34 and the particle filter 35.

The signals of the sensors that are present can be processed by a control unit, not illustrated, which, based on the signals and stored characteristic curves and characteristic maps, is able to determine operating states of the engine 1 in general, in particular in the exhaust tract 6 and in the air supply system 5, and to set same via control and/or regulation by controlling actuators. In particular, exhaust gas recirculation mass flows in the low- and high-pressure path as well as a load state of the engine 1 with regard to torque or average pressure as well as speed may be determined or set. In addition, fuel injection parameters such as the number of fuel injections per working cycle and the injection pressure, duration, and time thereof may be set.

The operation of the engine 1 and the exhaust emission control system 16 is explained in greater detail below.

Under normal operating conditions, i.e., with the engine 1 warmed up and the exhaust emission control system 16 operational, the engine 1 is operated with excess air which is typical for normal diesel engine operation. Removal of the oxidizable pollutants CO and HC in the exhaust gas is carried out primarily by means of the oxidation catalytic converter 34. Particles contained in the exhaust gas are filtered out by the particle filter 35, and nitrogen oxides contained in the exhaust gas are removed by the SCR catalyst coating of the particle filter 35 and/or by the SCR catalytic converter unit 36.

With regard to the nitrogen oxides removal, a dosing rate for adding the reducing agent by the dosing device 38 and/or the further dosing device, preferably based on an efficiency of the SCR catalyst coating or of the SCR catalytic converter unit 36 with respect to an instantaneous conversion of nitrogen oxides, is set by control and/or regulation. The dosing rate may be set based on a model, using a computation model or based on characteristic curves and/or characteristic maps kept on hand, as a function of instantaneous values of predefinable operating variables of the engine 1 and/or of the exhaust emission control system 16 in such a way that a nitrogen oxides reduction rate at least approximately reaches a predefinable setpoint value. Data concerning uncontrolled nitrogen oxides of the engine 1 and from nitrogen oxides sensors downstream from the particle filter 35 or the catalytic converter unit 36 are preferably evaluated. Deviations from the setpoint value are compensated for to the greatest extent possible by a counteracting change in the dosing rate.

With regard to the function of the particle filter 35, continuous monitoring of the soot loading thereof is provided. For this purpose, a differential pressure over the particle filter 35 determined by measurement is preferably evaluated by a loading model, taking exhaust gas mass flow and exhaust gas temperature into account, and an estimated value for the soot loading is thus ascertained. If the soot loading exceeds a predefinable limit value, a thermal regeneration of the particle filter 35 is requested. If predefinable criteria concerning the feasibility of carrying out a particle filter regeneration are met, the normal operation of the engine 1 is interrupted, and the engine is switched to a special operating mode. The elevated temperature of approximately 550° C. to 700° C. at the input side of the particle filter 35 that is required for soot burn-off is reached by changing the combustion parameters of the engine 1 and by releasing heat energy to the oxidation catalytic converter 34.

The activity of the SCR catalyst coating of the particle filter 35 or the effectiveness of the SCR catalytic converter unit 36 is typically greatly reduced on account of the elevated temperature of the particle filter 35 or of the exhaust tract 6 as a whole. To still achieve a reduction in nitrogen oxides, the engine 1 is operated with an air-fuel ratio having a lambda value of at least approximately $\lambda=1.0$ during the particle filter regeneration. At a combustion $\lambda$ of approximately 1.0, an exhaust gas $\lambda$ of approximately 1.0 is also present, and nitrogen oxides as well as oxidizable exhaust gas components may be reduced with high effectiveness by means of the oxidation catalytic converter. A transition is preferably made to an engine operation with $\lambda$ approximately 1.0 when it is determined that a final uncontrolled emission of nitrogen oxides exceeds a predefinable level. Supplying ammonia for reduction of nitrogen oxides is then neither necessary nor useful, and is therefore terminated or interrupted.

For setting a combustion $\lambda$ having a target value of approximately 1.0, initially a pilot control value is preferably set for the air-fuel ratio in the range between $\lambda=1.10$ and $\lambda=1.15$. For this purpose, the air feed quantity and the exhaust gas recirculation quantity are set to pilot control values as a function of the operating point by actuating the throttle valve 13, adjusting means for the exhaust gas turbochargers 9, 11, and the EGR valves 26, 28, and the quantity of fuel required for the $\lambda$ pilot control value is set via the sum of the pre-injection, the main injection, and the added post-injection. Typically, the throttle valve is closed to values between 70% and 95%, a charge pressure valve is closed to values between 5% and 45%, and a wastegate is closed to values between 25% and 45%. The high-pressure EGR valve 28 is preferably completely closed, and the exhaust gas recirculation quantity is set by actuating the low-pressure exhaust gas recirculation valve 26 and the exhaust gas damming flap 17. By offsetting a computed pilot control quantity of a delayed post-injection that is not torque-effective, at a crank angle of >80° after top dead center, enrichment occurs for achieving the $\lambda$ target value. The exact value thereof is set by processing a value of the oxygen content of the exhaust gas, which is detected by sensor preferably directly downstream from the oxidation catalytic converter 34, and readjusting the post-injection quantity. It is preferred to set, by regulation, a $\lambda$ value that oscillates within a predefinable target range. The $\lambda$ target range is preferably specified by a lower limit of $\lambda=0.95$ to $\lambda=0.98$ and an upper limit of $\lambda=1.0$ to $\lambda=1.05$. A preferred oscillation frequency is between 1 and 5 Hz. It has been shown that a particularly high conversion by the oxidation catalytic converter 34 with regard to CO and HC as well as NOx is made possible as a result of these settings.

With the settings preferably made for achieving an exhaust gas $\lambda$ of approximately 1.0, exhaust gas that is practically free of oxygen is present at the inlet side of the particle filter 35, which does not allow soot burn-off. For setting the oxygen content necessary for this purpose, according to the invention the secondary air dosing device 39 is activated and the exhaust gas upstream from the particle filter 35 is enriched with oxygen. It is preferred that the secondary air supply is set, in particular by regulation, in such a way that a predefinable soot burn-off rate results. An exhaust gas temperature difference over the particle filter 35, which is determinable, for example, by means of temperature sensors situated at the input side and the output side, may be used as a control variable for this purpose. In this way, on the one hand the duration of a particle filter regeneration may be reduced, and on the other hand, overheating of the particle filter 35 due to an excessively high soot burn-off rate may be avoided.

After the particle filter regeneration has concluded, or if a request for its termination has been made in some other way, essentially a return is made to the settings before the particle filter regeneration started. That is, the secondary air dosing device 39 is switched off, the engine 1 is returned to operation with excess air which is typical for normal diesel engine operation, and the addition of the nitrogen oxide-reducing agent as needed is resumed.

The reduction in NOx emissions to the surroundings, during the thermal particle filter regenerations to be occasionally carried out, due to the described stoichiometric engine operation may be improved by means of accompanying measures.

These preferably include a reduction in uncontrolled NOx emissions from the engine 1, in particular during the particle filter regeneration, which is preferably achieved by setting a low-pressure EGR rate which is increased in particular up to the provided maximum value. The high-pressure EGR rate is preferably reduced to zero in favor of the low-pressure EGR rate.

In this regard, a general aim is to minimize the number and frequency of particle filter regenerations. An increase in the uncontrolled NOx emissions from the engine 1 during normal operation, in particular at temperatures of the particle filter 35 of at or above 300° C., may be provided for this purpose. Oxidation at the oxidation catalytic converter 34 results in increased nitrogen dioxide ($NO_2$), which causes soot oxidation and continuous particle filter regeneration (CRT effect). As a result, the soot loading rate of the particle filter 35 decreases, and thermal regeneration is required less often. Another beneficial side effect is reduced fuel consumption of the engine 1, which typically accompanies the increase in uncontrolled NOx emissions. An increase in $NO_2$, and thus the desired CRT effect, is made possible by adding urea or ammonia upstream from the oxidation catalytic converter 34. An additional dosing unit which is activated as needed may be provided for this purpose.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for operating a motor vehicle diesel engine having an exhaust emission control system, comprising an oxidation catalytic converter, a particle filter, and an SCR catalytic converter, the method comprising:
    passing exhaust gas discharged from the diesel engine through the oxidation catalytic converter before passing through the particle filter and the SCR catalytic converter;
    occasionally regenerating the particle filter by thermal soot burn-off, wherein during burn-off of soot deposited on the particle filter during the regeneration of the particle filter
        the diesel engine is operated at an air-fuel ratio having a lambda value ($\lambda$) of at least approximately 1.0, and
        air is added to the exhaust gas after it exits the oxidation catalytic converter and before it enters the particle filter.

2. The method according to claim 1, wherein the air is added by branching off air from an intake tract of the diesel engine using a turbocharger.

3. The method according to claim 1, wherein during the regeneration of the particle filter, the addition of air is carried out with a mass flow quantity such that the burn-off of soot deposited on the particle filter occurs at a predefinable rate.

4. The method according to claim 3, wherein the added quantity of air is set by regulation using a temperature sensor situated downstream from the particle filter in such a way that the burn-off of soot deposited on the particle filter occurs at the predefinable rate.

5. The method according to claim 3, wherein the added quantity of air is set by regulation using a lambda sensor situated downstream from the particle filter in such a way that the burn-off of soot deposited on the particle filter occurs at the predefinable rate.

6. The method according to claim 1, wherein the oxidation catalytic converter has a three-way catalyst coating.

7. The method according to claim 1, wherein outside operating phases of the particle filter regeneration, the diesel engine is operated with excess air and ammonia or a reducing agent capable of splitting ammonia is added to the exhaust gas before it passes through the SCR catalytic converter.

8. The method according to claim 7, further comprising:
    transitioning the operation of the diesel engine with excess air to an operation with an air-fuel ratio having a lambda value of at least approximately 1.0 when it is determined that an end-of-pipe emission of nitrogen oxides exceeds a predefinable level.

9. The method according to claim 1, wherein the exhaust gas is passes through the SCR catalytic converter before or after passing through the particle filter.

10. The method according to claim 1, wherein the exhaust gas passes through the SCR catalytic converter which is a coating of the particle filter.

11. The method according to claim 1, wherein the exhaust gas passes through the particle filter, which is a wallflow filter having channels that, at least on a downstream portion, are provided with a coating containing an SCR catalyst material.

12. The method according to claim 1, wherein the exhaust gas passes through the particle filter, which is a wallflow filter having channels in an axially front portion with a coating containing an SCR catalyst material and channels in an axially rear portion that are uncoated or are provided with a coating having oxidation catalyst activity.

13. The method according to claim 1, wherein the diesel engine is selectively operated without exhaust gas recirculation, with high-pressure exhaust gas recirculation or with low-pressure exhaust gas recirculation, or simultaneously with high-pressure exhaust gas recirculation and low-pressure exhaust gas recirculation.

14. The method according to claim 1, wherein the diesel engine is operated with high-pressure exhaust gas recirculation and with low-pressure exhaust gas recirculation, the low-pressure portion of the overall exhaust gas recirculation mass flow being set by means of a damming flap situated downstream from the particle filter.

15. The method according to claim 14, wherein a rate of the high-pressure exhaust gas recirculation is reduced to zero during the regeneration of the particle filter.

16. A method for operating a motor vehicle diesel engine having an exhaust emission control system, comprising an oxidation catalytic converter, a particle filter, and an SCR catalytic converter, the method comprising:
    passing exhaust gas discharged from the diesel engine through the oxidation catalytic converter before passing through the particle filter and the SCR catalytic converter;
    occasionally regenerating the particle filter by thermal soot burn-off, wherein during burn-off of soot deposited on the particle filter during the regeneration of the particle filter
        the diesel engine is operated at an air-fuel ratio having a lambda value ($\lambda$) of at least approximately 1.0, and
        air is added to the exhaust gas after it exits the oxidation catalytic converter and before it enters the particle filter,
    wherein in order to set the air-fuel ratio for the operation of the diesel engine having a lambda value ($\lambda$) of at least approximately 1.0, initially a pilot control value is set for the air-fuel ratio in the range between $\lambda=1.10$ and $\lambda=1.15$, and subsequently an air-fuel ratio which oscillates between a value (λ) having a lower limit of λ=0.95 to λ=0.98 and an upper limit of λ=1.0 to λ=1.05 is set by feed-back control.

17. The method of claim 1, wherein exhaust gas passes from the particle filter to the SCR catalytic converter.

18. The method of claim 17, wherein a nitrogen oxide conversion function of the SCR catalytic converter is reduced during the regeneration of the particle filter due to the particle filter raising a temperature of the exhaust gas during regeneration of the particle filter.

19. The method of claim 18, wherein the oxidation catalytic converter performs nitrogen oxide conversion during regeneration of the particle filter.

* * * * *